(12) United States Patent
Tao et al.

(10) Patent No.: US 10,977,096 B1
(45) Date of Patent: Apr. 13, 2021

(54) MULTI-OBJECTIVE, MULTI-INPUT, EFFICIENT DECOUPLING HOLISTIC PLATFORM FOR COMMUNICATION SELECTION

(71) Applicant: Microsoft Technology Licensing, LLC, Redmond, WA (US)

(72) Inventors: Zhongen Tao, San Jose, CA (US); Matthew Hsing Hung Walker, Mountain View, CA (US); Ajith Muralidharan, Sunnyvale, CA (US); Adriel Fuad, Sunnyvale, CA (US); Yingkai Hu, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/588,232

(22) Filed: Sep. 30, 2019

(51) Int. Cl.
  *G06F 13/00* (2006.01)
  *G06F 9/54* (2006.01)
  *G06N 20/00* (2019.01)

(52) U.S. Cl.
  CPC .............. *G06F 9/542* (2013.01); *G06F 9/546* (2013.01); *G06N 20/00* (2019.01)

(58) Field of Classification Search
  CPC ....................................................... G06F 9/542
  USPC ............................................................ 719/321
  See application file for complete search history.

(56) References Cited

U.S. PATENT DOCUMENTS

2014/0129661 A1* 5/2014 Thyagaraja ............. H04L 51/24
                                                        709/207
2018/0337798 A1* 11/2018 Ilic .......................... H04L 51/32

* cited by examiner

*Primary Examiner* — Timothy A Mudrick
(74) *Attorney, Agent, or Firm* — Hickman Becker Bingham Ledesma LLP

(57) ABSTRACT

Technologies for determining whether to send notification messages, from different sources, to a target user are provided. The disclosed techniques include receiving a first notification event from a first notification service and receiving a second notification event from a second notification service. The first and second notification services are different services. Using a machine-learned model to assign a first score to the first notification event and a second score to the second notification event. Based on the first score, a determination is made to generate a first notification message for the first notification event. The first notification message is then sent to a target user. Based on the second score, a determination is made not to generate a second notification message for the second notification event.

20 Claims, 5 Drawing Sheets

US 10,977,096 B1

MULTI-OBJECTIVE, MULTI-INPUT, EFFICIENT DECOUPLING HOLISTIC PLATFORM FOR COMMUNICATION SELECTION

TECHNICAL FIELD

The present disclosure relates to optimizing notification message delivery for notifications generated by multiple sources.

BACKGROUND

Content management systems are designed to provide content items to users for consumption. Content items may represent content such as photos, video, job posts, news articles, documents, user posts, audio, and many more. Content management systems may implement various notification systems to generate and send notifications to recipients informing the recipients of pending content items for consumption about events or actions performed by other users that may be of interest to the recipients. For example, a first user, which has a connection to a second user, may publish or share a content item. The notification systems may identify that the second user may be interested in the content item published or shared by the first user and send a notification message to the second user. Upon receiving the notification message, the second user may initiate a user session in order to interact with the content item published or shared by the first user.

Recipients of notification messages may be more likely to interact with the content management system in response to receiving the notification message. However, if recipients receive too many notification messages, then interactions in response to a notification message may be less effective because the recipient may become annoyed or desensitized by receiving too many notification messages. Conventional notification systems may space out delivery of notification messages in order to reduce the chance of overwhelming recipients with too many notification messages. However, notification messages may be generated by different notification systems, each of which may be monitoring different notification triggers. For example, one notification system may analyze user anniversaries, such as work anniversaries or birthdays, to determine when to send notification messages, while another notification system may monitor user interactions to determine when to send notification messages. Each of these notification systems may have their own independent spacing algorithms. However, spacing algorithms for spacing out notifications may not be effective if the independent notification systems are unaware of what and when the other notification systems are sending messages to recipients.

Additionally, the independent notification systems may also prioritize notification messages based upon how each message has been scored relative to a desired objective. For example, a first notification system may prioritize messages A1, A2, and A3 as their top notification messages, and a second notification system may prioritize messages B1, B2, and B3 as their top notification messages, where messages B1 and B2 have a higher priority than message A1 in the eyes of the recipient. Since the independent notification systems are not aware of the message priorities of notification messages generated by other systems and priority scores for the messages are based on different performance metrics and/or scoring scales, messages A1 and B1 may be selected and sent to the recipient. As a result, the recipient may not receive the overall highest priority messages, which are messages B1 and B2.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
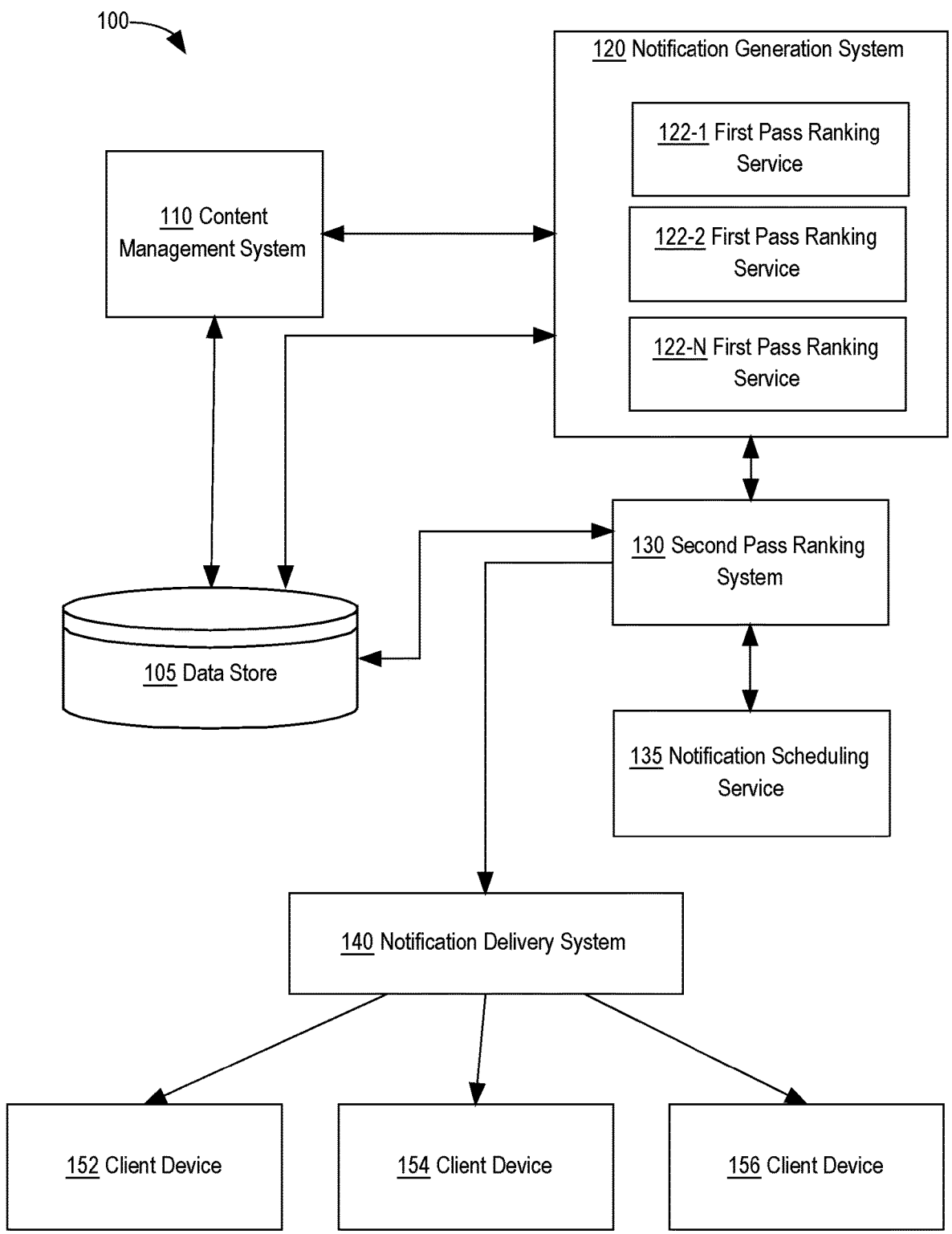
FIG. 1 is a block diagram that depicts a system for receiving notification events and determining whether to generate and send notification messages and by which delivery channel to send the notification messages.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

As disclosed herein, determining whether to send a notification message to a target user of a content management system in order to increase user interactions in response to reviewing the notification message is improved by adding technology that implements a particular approach of analyzing received notification events from multiple sources and determining whether to send notification messages, queue the notification events for later evaluation, or drop the notification events based upon a multi-objective notification ranking system. A notification event may represent a request to generate a notification message. The notification event may contain notification content and a target user of the notification message to be generated. In an embodiment, a first notification event may be received from a first notification service and a second notification event may be received from a second notification service, where the first notification service and the second notification service are distinct notification services that may implement their own techniques for ranking notification events. Using a machine-learned model, a first score is assigned to the first notification event and a second score is assigned to the second notification event. The assigned scores may be based on one of more desired performance objectives. For example, performance objectives may include maximizing user session duration, maximizing the number of user sessions initiated, and/or improving the quality of user sessions. Based on the first score assigned to the first notification event, a determination is made to generate a first notification message and send the first notification message to the target user. Based on the second score assigned to the second notification event, a determination is made to not generate a second notification message.

In an embodiment, if the second score of the second notification event is above a threshold, then the second notification event may be placed in an event queue for later reevaluation. Notification events sent to the event queue may be reevaluated and subsequently sent as notification messages, individually or in a batch, to the target user at a later time. If however, the second score of the second notification event is below the threshold, then the second notification event may be dropped entirely.

In an embodiment, routing of notification messages may be based upon their corresponding scores. For example, if the score of the first notification event is above a routing threshold, then the notification event may be deemed as having a higher priority and a notification message may be generated and sent to the user as a push notification. If, however, the score of the first notification event is below the routing threshold, then the notification event may be deemed as having a slightly less priority and a notification message may be sent to the target user as an in-application notification. If the score of the first notification event is determined to have a low priority then a notification message may be sent to the target user as an email notification.

The disclosed approaches provide advantages over conventional solutions by implementing a multi-objective notification scoring system that receives notification events from multiple sources and prioritizes incoming notification events based on their assigned multi-objective optimization score. Conventional notification systems may independently optimize notification message delivery to target users. However, the conventional notification systems do not factor in how and when other notification systems are sending notification messages to target users, resulting in a diminished optimization of notification message delivery. Additionally, updates or changes to content management system configurations and interfaces for independent notification systems may result in duplicate efforts of updating configurations for the notification systems to ensure compatibility across all systems. The disclosed approaches provide greater efficiency in optimizing notification message delivery across all notification systems by receiving uniform notification events from each of the notification systems, scoring each of the notification events using the multi-objective notification ranking system, and scheduling delivery of notification messages taking into account pending notification events from the multiple notification systems. Additionally, the disclosed approaches provide greater efficiency when updating or modifying downstream notification systems because duplicate efforts to configure the independent notification systems may be eliminated as each of the independent notification systems send their pending notification events to a single downstream system for routing and message delivery.

System Overview

FIG. 1 is a block diagram that depicts a system 100 for receiving notification events and determining whether to generate and send notification messages and by which delivery channel to send the notification messages. System 100 may represent a content platform that includes a data store 105, a content management system 110, notification generation system 120, a second pass ranking system 130, a notification scheduling service 135, a notification delivery system 140, and client devices 152-156. Although a single content management system is depicted, system 100 may include additional content management systems. Similarly, system 100 may include additional notification systems.

In an embodiment, the content management system 110 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide a user with access to content items and/or provide the content items to the user. For example, the content management system 110 may allow a user to consume, upload, search for, approve of (e.g. "like"), dislike, and/or comment on content items.

Examples of content items may include, but are not limited to, messages, articles, media such as pictures, video, and sound clips, invitations to connect, and any other event or object that may be consumed by a user. A user session may refer to a period of activity between when a user logs into the content platform and the user logs out of the content platform. For example, Jane Smith may initiate a user session by logging into the content platform. Jane Smith may visit several pages, and then end her user session by logging out or by not interacting with the content platform for a period of time.

In an embodiment, the content management system 110 may track user sessions and store related user session metrics in the data store 105. User session metrics may include, but are not limited to, time and date of the user session, the user who initiated the user session, the duration of the user session, number of actions performed and number of pages visited during the user session, number and type of notifications received by the user, and whether user sessions were in response to interacting with a received notification message. In an embodiment, the content management system 110 may also generate user-specific aggregated metrics that describe metrics related to user sessions initiated in response to receiving different notification message types, such as push notifications, in-application notifications, email notifications, and any other notification type. For example, the content management system 110 may generate aggregated metrics that describe the number of user sessions and average duration of the user sessions initiated in response to receiving notification messages from different notification delivery channels. Notification delivery channels may refer to the different types of delivery methods for notifications. For example, a first delivery channel may represent notification messages delivered via an email message. A second delivery channel may represent notification messages delivered via a push notification, and a third delivery channel may represent notification messages delivered via in-app notification alerts. A push notifications may represent a notification message sent to a client application on a target user's device, when the client application is not open. The push notification may be displayed as a badge icon, such as a red circle appearing on the client application icon. In-app notifications may represent a notification message that pops up within the client application while the client application is running.

In an embodiment, the data store 105 may represent data storage that stores user session metrics, aggregated user session metrics corresponding to the different notification delivery channels as well as user session metrics corresponding to the various time windows when users receive notification messages. User session metrics may include user interaction history of user sessions. The stored data may be accessed by the content management system 110, the notification generation system 120, and the second pass ranking system 130.

In an embodiment, the notification generation system 120 represents a collection of one or more notification generation services implemented to determine whether a notification should be generated based upon user interaction activity from the content management system 110 and/or based upon milestone events related to user profile attributes. First pass ranking services 122-1, 122-2, and 122-N may represent a set of notification generation services implemented to generate notification events and send the notification events to the second pass ranking system 130. Each of the first pass ranking services 122-1, 122-2, and 122-N may represent different types of notification generation services that are each focused on generating different types of notifications that may be triggered using different types of user profile attributes and/or different types of user interaction data. Different types of notifications may include, but are not limited to, offline notifications, online notifications, and near-line notifications.

An offline notification may represent a time insensitive notification containing content based upon user profile attributes, such as a birthday or work anniversary. For example, if user A has an upcoming work anniversary next week, then an offline notification message may be generated for the upcoming work anniversary and may be scheduled to be sent to target users on the day of the work anniversary or sometime thereafter. Offline notifications are not dependent on user interaction data and are not time sensitive.

Online and near-line notifications may be notifications that are based upon specific user activity and may be time sensitive. For instance, if user A likes, comments, or shares a content item, then an online or near-line notification may be generated, where the content of the notification includes the liking, commenting, or sharing of the content item. Online and near-line notifications are generally time sensitive as the corresponding content item may be trending, or may relate to timely news, such as a news article. Online notifications represent notifications that are sent in real-time in response to detecting a particular user interaction, such as a user sharing or liking a content item on a timely event. Near-line notifications represent notifications that are generated near real-time or closely thereafter. Near-line notifications may be generated in response to user activity but may not be required to be sent in real-time. For instance, if user A shares or publishes content that is not immediately time sensitive, then a near-line notification is sent to other users within minutes or hours of user A's activity.

In an embodiment, each of the first pass ranking services 122-1, 122-2, and 122-N may generate a notification event and send the notification event to the second pass ranking system 130. A notification event may represent a request to generate a notification. The notification event may include, but is not limited to, content of the notification, a set of target users identified to receive a corresponding notification message, a source user for which the corresponding notification message is related, and any other pertinent user profile information, user interaction data, and calculated utility scores. Pertinent user profile information may include user profile attributes related to the notification event, such as a source user's birthday, work anniversary, or other user attribute. User interaction data may include content viewed and/or clicked on by the source user as well as user session information.

A utility refers to a specific prediction for a notification. For example, one utility may refer to a probability that a target user will click on a notification (pClick), while another utility may refer to the probability that a user will disable all future notifications (pDisable). Utility scores represent a probability value for the specific utility. In an embodiment, first pass ranking services may calculate utility scores when determining whether to generate a notification event. For example, the first pass ranking service 122-2 may calculate a pClick value and based on the pClick value, may generate and send a notification event to the second pass ranking system 130.

Examples of utility scores may include, but are not limited to, pClick, pVisit, pDisable, and eValue. The pClick value represents a probability that a target user of the notification clicks on the notification. The pVisit value represents a probability that a target user initiates a new user session, in response to receiving a notification, within a period of time. The pDisable value represents probability that a target user, upon receiving a notification message, disables notifications from their device. The eValue value represents a probability that a target user, in response to receiving a notification, initiates a high-quality user session defined by a specific level of user interactions by the user. A high-quality user session may represent a user session in which a user performs a specific number of user interactions with content items. For example, if user A initiates a user session in which she clicks on very few content items, visits very few pages, or the duration of the user session is only a few seconds long, then the user session may be classified as a low-quality user session. Conversely, if user A, during a user session, interacts with a number of content items, visits several pages, and/or the duration of the user session is above a desired duration, then the user session may be classified as a high-quality user session.

In an embodiment, the first pass ranking service 122-1 may represent a notification generation service implemented to generate offline notifications. The first pass ranking service 122-1 may analyze source user profile information from the data store 105 to determine whether an offline notification should be generated for target users related to the source user. For example, if the source user has a pending work anniversary, then the first pass ranking service 122-1 may determine, from the source user's profile, that the source user is about to celebrate a work anniversary. The first pass ranking service 122-1 may then generate a notification event and send the notification event to the second pass ranking system 130.

In an embodiment, the first pass ranking service 122-2 may represent an online and/or near-line notification service implemented to send notification events to the second pass ranking system 130. For example, if the first pass ranking service 122-2 detects that the source user, during a user session, likes, shares, or comments on a content item, then the first pass ranking service 122-2 may identify the source user's interaction with the content item and may generate a notification event to be delivered to the second pass ranking system 130. In an embodiment, the notification event may include any calculated utility scores, such as the pVisit and/or pClick scores calculated by the first pass ranking service 122-2. In another embodiment, utility scores calculated by the first pass ranking service 122-2 may be stored in the data store 105 for future access by the second pass ranking system 130.

In an embodiment, the first pass ranking service 122-N may represent one or more other notification generation services implemented in the notification generation system 120. For instance, the first pass ranking service 122-N may represent either a commercial or proprietary notification generation service that generates either online, near-line, or offline notification events. In an embodiment, the notification generation system 120 may include more or less notification generation services, each of which may represent commercial or proprietary notification services. Each of the first pass ranking services 122-1, 122-2, and 122-N may include, in generated notification events, calculated utility scores and/or may store the calculated utility scores in the data store 105.

Second Pass Ranking System

In an embodiment, the second pass ranking system 130 may implement a second pass ranking model that receives notification events from first pass ranking services 122-1, 122-2, and 122-N, scores the notification events, and, based on the assigned scores, determines whether to send a notification message to users, queue the notification event for future consideration, or to delete the notification event. The second pass ranking model may represent a multi-objective notification ranking algorithm that incorporates multiple utility scores that represent different prediction objectives for a given notification.

Figure 2:
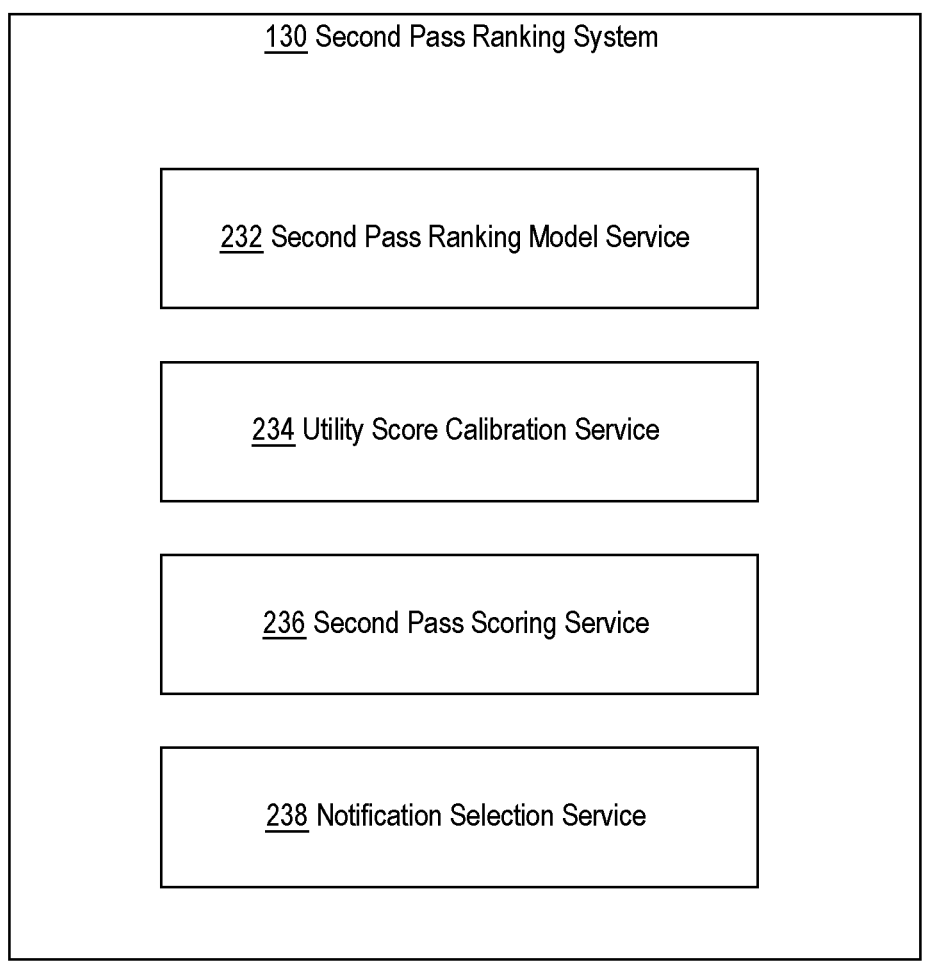
FIG. 2 depicts an example embodiment of functional components within a second pass ranking system implemented to score notification events and determine how to route notification messages for delivery.

FIG. 2 depicts an example embodiment of functional components within the second pass ranking system 130 implemented to score notification events and determine how to route notification messages for delivery. In an embodiment, the second pass ranking system 130 may include a second pass ranking model service 232, a utility score calibration service 234, a second pass scoring service 236, and a notification selection service 238.

Second Pass Ranking Model

In an embodiment, the second pass ranking model service 232 implements the second pass ranking (SPR) model that incorporates utility scores for different desired prediction objectives. For example, if the desired prediction objectives are to include predicting a level of user engagement, then the pClick utility score may be incorporated in the SPR model and may be assigned an appropriate weight coefficient.

In an embodiment, the SPR model may include one or more utility scores provided by the first pass ranking services 122-1, 122-2, and 122-N. For example, first pass ranking service 122-1 may determine and provide a pClick utility score for a given notification event to the second pass ranking model service 232. In another example, first pass ranking service 122-2 may determine and provide a pVisit utility score for a notification event to the second pass ranking model service 232. In yet another example, first pass ranking service 122-2 may determine and provide an eValue score for a notification event to the second pass ranking model service 232.

In an embodiment, if a utility score value for a specific utility is not provided by one of the first pass ranking services, then the second pass ranking system 130 may calculate the utility score value by retrieving relevant user interaction metrics from the data store 105. For example, if the pClick value for a specific target user was not provided by a first pass ranking service 122-2, then the second pass ranking system 130 may retrieve historical user interaction data that includes the number of times the target user received a notification and the number of times the target user clicked on the notification.

In an embodiment the SPR model may include more or less utility scores depending upon which objectives are to be emphasized. For example, the SPR model may be represented as:

SPR score=$\alpha p$Click+$\beta p$Disable+$\delta p$Visit where the SPR score represents a second pass ranking score for a notification event and the $\alpha$, $\beta$, and $\delta$ coefficients represent weight parameters that may be assigned to each of the utility scores.

In an embodiment, the second pass ranking model service 232 may implement machine-learning techniques, using historical user interaction data, to train the SPR model by determining the weight parameters for the $\alpha$, $\beta$, and $\delta$ coefficients. Examples of machine-learning techniques to implement the SPR model may include, but are not limited to, heterogeneous causal models, online Bayesian hyperparameter tuning methods, or offline optimization techniques. The historical interaction data may be used as training data to determine which weight values should be assigned to each of the weight parameters. The training data may include interaction data of the target user, in response to receiving a notification message. The training data may also include information about each notification message received, such as the notification content type, the time and day of the week the notification was received, and the delivery channel for the notification. For instance, if the target user, in response to receiving a notification message, initiates a new user session that includes a certain number of interactions, then the second pass ranking model service 232 may determine whether the notification resulted in a high-quality user session. In an embodiment, the second pass ranking model service 232 may re-train the multi-objective notification ranking algorithm to update the weight parameters for the $\alpha$, $\beta$, and $\delta$ coefficients on a scheduled basis, such as every day, every week, or any other scheduled duration.

In an embodiment, the second pass ranking model service 232 may determine user specific weight parameters for specific sets of utilities in the SPR model. For example, the SPR model weight parameters may be tailored to each individual user based upon the user's historical interaction metrics and responses to various notifications at various times. In another embodiment, the second pass ranking model service 232 may determine specific weight parameters for specific sets of utilities in the SPR model based upon a group of users and their historical interaction metrics. The user groups may be identified based upon similar user profiles attributes, such as similar educational backgrounds, industries, or geo-location, or by similar user behaviors, such as frequency of user interactions. For example, users that log into the content management system 110 daily or even hourly may be grouped together and users that infrequently log into the content management system 110, such as once a week, may be grouped together. In yet another embodiment, a default weight parameters for specific sets of utilities in the SPR model may be determined for all users that log into the content management system 110. In an embodiment, the second pass ranking model service 232 may store the calculated weights for utilities in the data store 105.

Utility Score Calibration Service

In an embodiment, the utility score calibration service 234 adjusts utility scores provided by first pass ranking services in order ensure uniform score values between different ranking services. For example, the first pass ranking service 122-1 may calculate a first set of pClick scores using its own algorithm and the first pass ranking service 122-2 may calculate a second set of pClick scores using its own algorithm. In order to ensure that the first set and second set of pClick scores are compatible, the utility score calibration service 234 may analyze the first set of pClick scores and the second set of pClick scores against historical user interaction data in response to receiving notifications. The utility score calibration service 234 may then determine a first adjustment factor that may need to be applied to pVisit scores from the first pass ranking service 122-1 (the first set of pClick scores) and a second adjustment factor may need to be applied to pClick scores from the first pass ranking service 122-2 (the second set of pClick scores). The adjustment factors may be additive values or multiplicative adjustment values. In an embodiment, the utility score calibration service 234 may periodically analyze utility scores from first pass ranking services and adjust the corresponding adjustment factors accordingly.

In an embodiment, the utility score calibration service 234 may implement budget-based calibration rules that ensure that the second pass ranking system 130 receives a proportional number of notification events from each of the first pass ranking services 122-1, 122-2, and 122-N. For example, the utility score calibration service 234 may analyze notifications received by a single target user or a group of target users over a period of time and determine an average range of notifications received from each first pass ranking service. For example, the utility score calibration service 234 may analyze notifications from a group of target users, identified as users who log in daily, over a period of one week. The utility score calibration service 234 may determine a range of incoming notification events for a user from the first pass ranking service 122-1 as:

$$B_1 < n\text{Notification\_Event}_{first\ pass\ ranking\ service\ 122\text{-}1} < B_2$$

where the nNotification Event is the number of notification events from the the first pass ranking service 122-1 and values $B_1$ and $B_2$ represent an upper and lower limit for the number of notification events over a period of time. The utility score calibration service 234 may then allot a budget of the number of notification events to be received from each first pass ranking service over a period of time, such that no one service may overwhelm the total number of notification events. This is especially useful as the system 100 may implement daily constraints on the total number of notification messages that may be sent to a target user over a given period of time.

Second Pass Scoring Service

Upon receiving a notification event from one of the first pass ranking services, the second pass scoring service 236 scores the notification event using the SPR model with weight parameters for utility values specific to a user group that includes the target user. For example, if the second pass ranking system 130 receives a notification event for a target user, then the second pass scoring service 236 may communicate with the second pass ranking model service 232 to retrieve the weight parameters specific to the target user from the data store 105. The weight parameters may include weight parameter values for α, β, and δ coefficients. In an embodiment, the second pass scoring service 236 may configure the SPR model using the retrieved weight parameter values and then calculate an SPR score for the notification event with respect to the target user. In an embodiment, weight parameter values may be specific to a particular user's preferences, a particular group of users' preferences, or may be based upon overall preferences determined for all of the users using the content management system 110.

Notification Selection Service

After a notification event has been scored by the second pass scoring service 236, a determination is made as to whether a notification message will be generated for the notification event. In an embodiment, the notification selection service 238 implements one or more decision thresholds to determine whether:
   a. a notification message should be generated and routed to the target user,
   b. the notification event should be queued by the notification scheduling service 135 for later consideration, or
   c. the notification event should be dropped.

The notification selection service 238 may generate a first and second decision threshold to evaluate the corresponding SPR score of a notification event in order to determine whether to generate and send a notification message, queue the notification event, or drop the notification event. The first decision threshold may be used to determine whether to generate a notification message for the notification event or to queue the notification event. The second decision threshold may be used to determine whether to queue the notification event or drop the notification event entirely. For example, if the SPR score of the notification event is above the first decision threshold then a notification message is generated. If the SPR score of the notification event is below the first decision threshold but above the second decision threshold, then the notification message is sent to the notification scheduling service 135 for queuing and later consideration. If the SPR score of the notification event is below the second threshold then the notification event is dropped and no notification message is generated.

In an embodiment, the notification selection service 238 may implement machine learning techniques to determine the first and second decision thresholds based on historical user interaction data associated with historical notification messages. For example, the notification selection service 238 may use historical user interaction data associated with historical notification messages for a target user or set of target users over a period of time as training data to determine optimal threshold values for the first and second decision threshold. In an embodiment, the notification selection service 238 may adjust the first and second decision thresholds based upon target user behavior over a period of time, such as a day or a week. For example, if the target user behavior indicates that the target user is most active during the morning and is not active at all during the afternoon, then the first decision threshold, which is used to determine whether to send a notification message or queue the notification event, may be lowered during the morning in order to promote sending notification messages in the morning. The notification selection service 238 may then raise the first decision threshold in the afternoon in order to reduce the number of notification messages sent to the target user during a time of observed inactivity.

Upon determining that the SPR score for a notification event is above the first decision threshold, the notification selection service 238 may determine that a notification message should be generated. The notification selection service 238 may then determine a delivery method for the notification message. Delivery methods may include, but are not limited to, a push notification, an in-application (in-app) notification, and an email notification. In an embodiment, notification selection service 238 may preselect notification message routing options based upon the notification event type and the first pass ranking service type. For example, first pass ranking services that produce non-time sensitive notification events, such as birthday or anniversary notifications, may be sent as an email notification or an in-app notification. In another example, first pass ranking services that produce time sensitive notification events, such as comments, likes, and shares of content items, may be sent as a push notification, an in-app notification, or as an email notification. Email notifications may be selected when notification events have been previously queued by the notification scheduling service 135 and are being reevaluated by the notification selection service 238.

If the notification selection service 238 determines that the SPR score for a notification event is above the first decision threshold, then the notification event may be marked for generating a notification message. The notification message may be sent via a push notification or an in-app notification. In an embodiment, notification selection service 238 may use a routing threshold to determine whether to route the notification message via push notification or in-app notification. The notification selection service 238 may implement machine learning techniques to determine an optimal value of the routing threshold based upon historical user interaction data associated with historical notification messages. The routing threshold may then be compared against the SPR score associated with the notification event. If the SPR score is above the routing threshold, then the notification selection service 238 may send the notification message as a push notification to the target user. If, however, the SPR score is below the routing threshold, then the notification selection service 238 may send the notification message as an in-app notification to the target user.

If the notification selection service 238 determines that the SPR score for a notification event is below the first decision threshold but above the second decision threshold, then the notification selection service 238 may send the notification event to the notification scheduling service 135, which may queue the notification event for later processing. The notification scheduling service 135 may, after a period of time, resend the notification event to the second pass ranking system 130 to determine whether to generate and send a notification event.

In an embodiment, if the notification event was previously sent to the notification scheduling service 135 and resent back to the second pass ranking system 130 for reevaluation, then the notification selection service 238 may determine routing of the notification event based upon a duration of time the notification event was in the notification event queue. A threshold queue duration value may represent a specific duration of time for determining whether to send a notification message as an in-app notification or as part of an email notification. For example, if a notification event stays in the notification event queue for a duration of time that is greater than the threshold queue duration value, then the notification event may be sent as part of a batch notification in an email notification. In another example, if the notification event stays in the notification event queue for a duration of time that is less than the threshold queue duration value, then the notification event may be sent as an in-app notification to the target user.

In an embodiment, upon determining that a notification message is to be generated from a notification event, the notification selection service 238 may send a request to the notification delivery system 140 to generate and send the message to the target user. The request may include, but is not limited to, the notification content, the target user, the selected delivery method, and the delivery time. The delivery time may represent when the notification message should be delivered to the target user. For instance, the delivery time may specify immediate delivery or a delayed delivery. Delaying delivery of a notification message may occur if the target user's session behavior indicates that the target user does not interact with the content management system 110 during specific times or days. For example, if the target user typically does not log into the content management system 110 after 10 PM and before 8 AM, then the notification selection service 238 may delay delivery of notification messages until the target user typically initiates user sessions. In an embodiment, the notification selection service 238 may analyze user behavior by accessing user session metrics and user interaction metrics to determine the optimal time for notification message delivery. In another embodiment, notification messages may be delayed if the target user has already received a maximum number of notifications for a period of time. For example, the notification delivery system 140 may cap the total number of notification messages sent to a target user over a period of time. This may occur to preserve processing resources in the system 100 and to avoid overwhelming a target user with too many notification messages.

Notification Scheduling Service

In an embodiment, the notification scheduling service 135 may implement an event queue to store incoming notification events from the second pass ranking system 130. Notification events stored in the event queue may then be resent to the second pass ranking system 130 for reevaluation at a later time. The notification events stored in the event queue may also include additional information, such as their corresponding SPR score. By storing the corresponding SPR scores, the second pass ranking system 130 may skip rescoring the notification events and may use their previously scored SPR scores when reevaluating the notification events. This may reduce processing resources used by the second pass ranking system 130 to score incoming notification events.

In an embodiment, after a period of time the notification scheduling service 135 may select one or more notification events from the event queue and send the one or more notification events to the second pass ranking system 130 for reevaluation. For example, the notification scheduling service 135 may select a subset of notification events that include the top 10% of notification events based on their SPR scores. The subset of notification events may be sent to the second pass ranking system 130 and evaluated as a batch because their corresponding SPR scores have already been calculated. For instance, the subset of notification events may be sent directly to the notification selection service 238 for evaluation. Selection of a notification event from the event queue may be performed on a periodic basis, such as every hour or every 4 hours, or may be triggered on demand by the second pass ranking system 130.

In another example, the notification scheduling service 135 may select a single notification event from the event queue. Selection of a single notification event may be based on position in the event queue, such as the notification event at the top of the event queue is selected next, or selection may be based on corresponding SPR scores. In yet another example, selection of one or more notification events may be based on duration of time in the event queue. For example, a subset of notification events may be selected if notification events have been in the event queue for a significant period of time. This subset may be sent to the notification selection service 238 which may batch the subset of notification events into a single batch notification message to be sent to the target user as an email notification.

Notification Delivery System

In an embodiment, the notification delivery system 140 generates notification messages for target users and sends the notification messages to client devices 152-156 for corresponding target users. The notification delivery system 140 may be enabled to generate various different types of notification messages including, but not limited to, in-app notifications, email notifications, and push notifications. The notification delivery system 140 may receive a request, from the second pass ranking system 130, that identifies one or more target users selected to receive the notification message and the notification message delivery type, such as push, in-app, or email, and a delivery time for the notification messages. The notification delivery system 140 may generate the corresponding notification messages according to the notification message delivery type and may schedule delivery to the client devices 152-156 based on the delivery time for the notification messages.

In an embodiment, client devices 152-156 may represent computing devices including, but not limited to, desktop computers, laptop computers, tablet computers, wearable devices, video game consoles, and smartphones. Client devices 152-156 may represent devices users may use to receive notifications and initiate new user sessions.

Processing Overview

Figure 3:
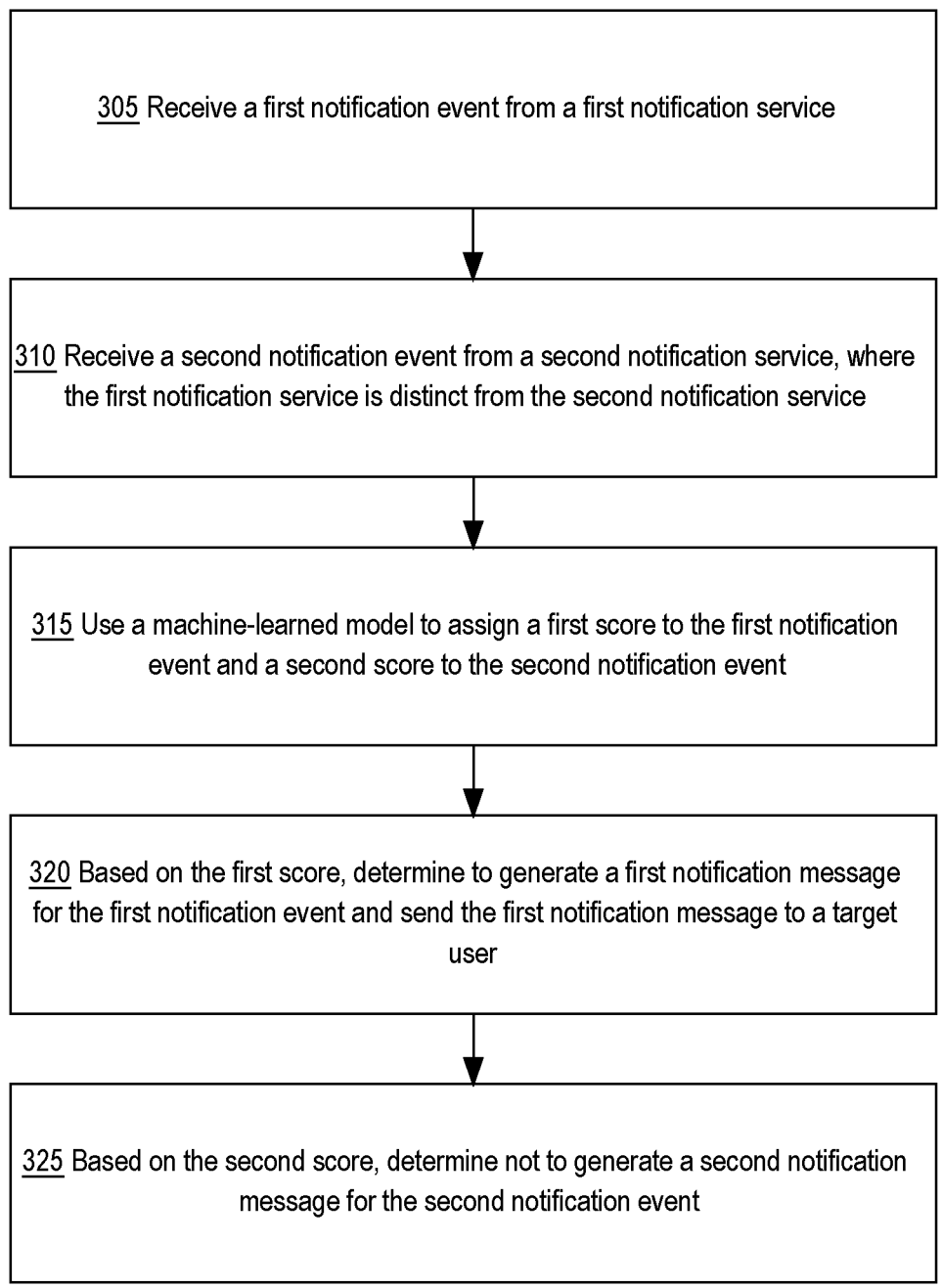
FIG. 3 depicts an example flowchart for determining whether to generate and send notification messages for notification events received from different sources.

FIG. 3 depicts an example flowchart for determining whether to generate and send notification messages for notification events received from different sources. Process 300 may be performed by a single program or multiple programs. The operations of the process as shown in FIG. 3 may be implemented using processor-executable instructions that are stored in computer memory. For purposes of providing a clear example, the operations of FIG. 3 are described as performed by the system 100 and its components. For the purposes of clarity process 300 is described in terms of a single entity.

In operation 305, process 300 receives a first notification event from a first notification service. For example, the first pass ranking service 122-2 sends the first notification event to the second pass ranking system 130. The first pass ranking service 122-2 may detect an event that triggers a notification event, such as a source user liking, commenting, or sharing a content item. The first pass ranking service 122-2 may generate the notification event, which may include the content of the notification, the source user, a target user, and one or more utility scores calculated by the first pass ranking service 122-2 and used to determine that the notification event should be sent to the second pass ranking system 130.

In operation 310, process 300 receives a second notification event from a second notification service, where the first notification service is distinct from the second notification service. For example, the first pass ranking service 122-1 sends the second notification event to the second pass ranking system 130. The first pass ranking service 122-1 may determine to send the notification event based on the source user's profile attribute, such as the source user has a work anniversary upcoming. The first pass ranking service 122-1 may generate the notification event, which may include the content of the notification, the source user, a target user, and one or more utility scores calculated by the first pass ranking service 122-1 and used to determine that the notification event should be sent to the second pass ranking system 130.

Figure 4:
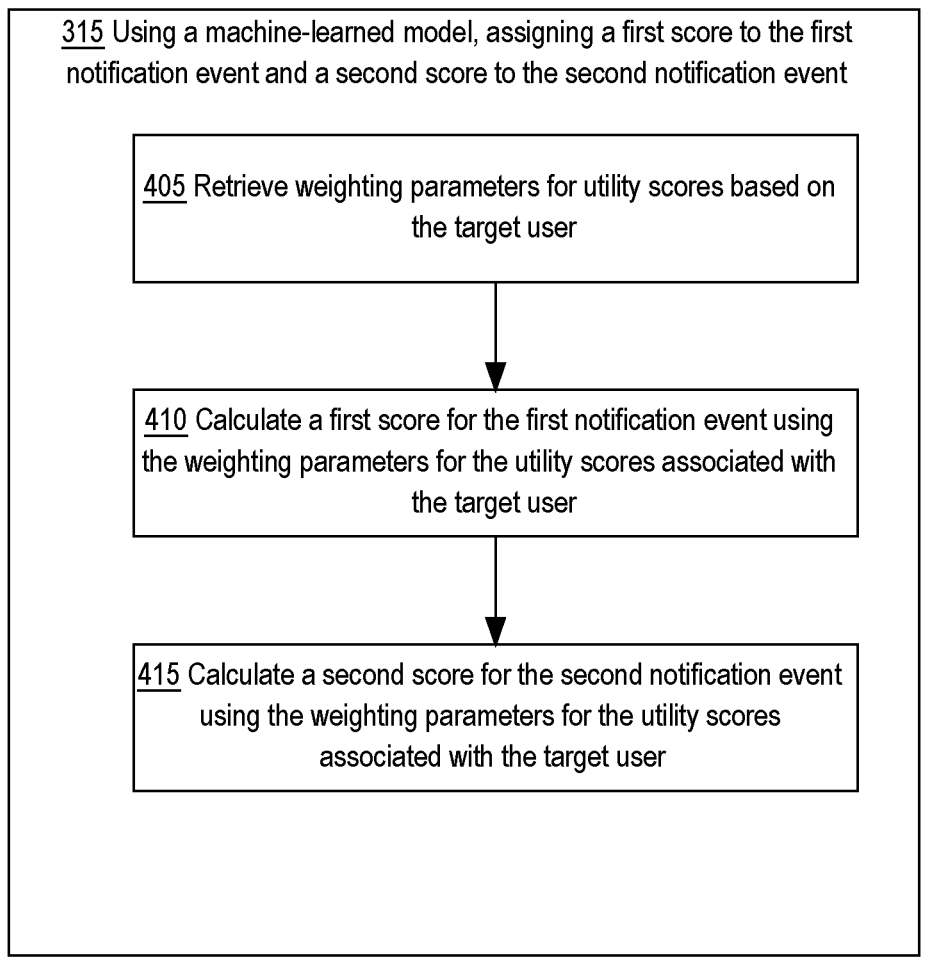
FIG. 4 depicts an example flowchart for assigning a first score to the first notification event and a second score to the second notification event.

In operation 315, process 300 uses a machine-learned model to assign a first score to the first notification event and a second score to the second notification event. In an embodiment, the second pass scoring service 236 uses the SPR model to assign a first score to the first notification event and a second score to the second notification event. FIG. 4 depicts an example flowchart for assigning a first score to the first notification event and a second score to the second notification event. Process 400 may be performed by a single program or multiple programs. The operations of the process as shown in FIG. 4 may be implemented using processor-executable instructions that are stored in computer memory. For purposes of providing a clear example, the operations of FIG. 4 are described as performed by the second pass scoring service 236. For the purposes of clarity process 400 is described in terms of a single entity.

In operation 405, process 400 retrieves weighting parameters for utility scores based on a group of users that includes the target user. In an embodiment, the second pass scoring service 236 requests from the second pass ranking model service 232, weighting parameters for the utility scores in the SPR model based upon on a group of users that includes the target user. The second pass ranking model service 232 then retrieves the SPR model weighting parameters, from the data store 105, that have been calculated for the target user based upon historical user interaction activity of the target user.

In operation 410, process 400 calculates a first score for the first notification event using the weighting parameters for the utility scores associated with the target user. In an embodiment, the second pass scoring service 236 retrieves any utility scores from the first notification event. For example, if the first notification event included a pClick utility score, then the second pass scoring service 236 may use that pClick utility score in the SPR model. For any other utility scores, such as pVisit and pDisable, the second pass scoring service 236 may retrieve target user interaction data from the data store 105 and calculate the pVisit and pDisable scores. In an embodiment, the second pass scoring service 236 is not required to use utility scores from notification events. For example, for one notification event the second pass scoring service 236 may use a pClick score from the notification event, and for another notification event the second pass scoring service 236 may calculate the pClick score even when the other notification event provides a pClick score. Decisions to either use or not use utility scores from notification events are not dependent on the notification type, first pass ranking service, or any other factor. In an embodiment, the second pass scoring service 236 may apply each of the weighting parameters to their corresponding utility scores to calculate an SPR score for the first notification event. Referring to the SPR model, the SPR score may be calculated as:

$$\text{SPR score} = \alpha p\text{Click} + \beta p\text{Disable} + \delta p\text{Visit}$$

where the $\alpha$, $\beta$, and $\delta$ coefficients represent weighting parameters specific to the target user retrieved from the data store 105.

In an embodiment, utility values retrieved from the first notification event that represent real-time interaction metrics may be updated by the second pass scoring service 236 by retrieving real-time interaction data from the data store 105. For example, if the pVisit value is based on real-time interaction metrics, the second pass scoring service 236 may recalculate the pVisit value by incorporating the retrieved real-time interaction metrics.

In operation 415, process 400 calculates a second score for the second notification event using the weighting parameters for the utility scores associated with the target user. In an embodiment, the second pass scoring service 236 retrieves any utility scores from the second notification event. Similar to the steps described in operation 410, the second pass scoring service 236 may retrieve any needed target user interaction data from the data store 105 and calculate and/or update utility scores for the SPR model in order to calculate the second score for the second notification event.

Referring back to FIG. 3, in operation 320, process 300 determines, based on the first score, to generate a first notification message and send the first notification message to the target user. In an embodiment, the notification selection service 238 uses the first score to determine that a notification message should be generated. The notification selection service 238 compares the first score to the first decision threshold, which represents an upper threshold value for determining whether to generate and send a notification message or whether to send the notification event to queue in the notification scheduling service 135. If the first score is above the first decision threshold then the notification selection service 238 send a request to generate the first notification message to the notification delivery system 140. The notification delivery system 140 may generate and send the first notification message to client device 152, which is operated by the target user.

In an embodiment, the request to generate the first notification message may include a request to delay delivery of the first notification message to the target user. This may occur if the notification selection service 238 determines based upon the target user's activity patterns that the first notification message should be delayed for a period of time. For instance, if the target user is typically offline from 9 PM to 10 AM, then the notification message may be delayed until the target user is awake and receptive to the notification message.

In an embodiment, the request to generate the first notification message may include a delivery method, such as push notification or in-app delivery. The notification selection service 238 may implement a first routing threshold, which represents a threshold value for determining whether to send the first notification message as a push notification or as an in-app notification. If the first score is above the first routing threshold, then the notification selection service 238 may indicate, in the request to the notification delivery system 140, that delivery should be via a push notification. If, however, the first score is below the first routing threshold, then the notification selection service 238 may indicate that delivery should be via an in-app notification.

In operation 325, process 300 determines, based on the second score, not to generate a second notification message for the second notification event. In an embodiment, the notification selection service 238 uses the second score to determine that a notification message should be generated. The notification selection service 238 compares the second score to the first decision threshold and determines that the second score is below the first decision threshold. In response, the notification selection service 238 determines not to generate the second notification message.

In an embodiment, the notification selection service 238 compares the second score to a second decision threshold, where the second decision threshold represents a threshold value for determining whether to send the notification event to the event queue, managed by the notification scheduling service 135, for future evaluation or to drop the notification event. If the second score is less than the second decision threshold, then the notification selection service 238 drops the second notification event entirely. If, however, the second score is greater than the second decision threshold, then the notification selection service 238 sends the second notification event to the notification scheduling service 135 to input into the event queue.

In an embodiment, the notification scheduling service 135 may periodically or on-demand select one or more notification events from the event queue and send the notification events to the notification selection service 238 for reevaluation. The notification selection service 238 may then reevaluate the one or more notification events individually or in a batch using the SPR scores previously stored with the notification events in the event queue. If the one or more notification events are reevaluated as a batch, then notification selection service 238 may send a batch request to the notification delivery system 140 to generate and send a notification message to client device 152 of the target user.

In an embodiment, determining a delivery method for a notification event coming from the event queue may be based on the duration of time the notification event was in the queue. For example, the notification scheduling service 135 selects notification events for reevaluation based on their respective SPR scores. If the SPR score of a particular notification event is very high then the particular notification event would be selected sooner than a notification event with a very low SPR score. In an embodiment, the notification selection service 238, when reevaluating a notification event that is coming from the event queue, may compare the duration of time that the notification event was in the event queue to a queue threshold duration value. The queue threshold duration value may represent a threshold value for determining whether to send the notification message as an in-app notification or as an email notification. If the duration of time of the notification message is above the queue threshold duration value, then the notification selection service 238 may send a request to the notification delivery system 140 to generate a notification message as an in-application notification message. If, however, the duration of time of the notification message is below the queue threshold duration value, then the notification selection service 238 may send a request to the notification delivery system 140 to generate a notification message as an email notification message.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
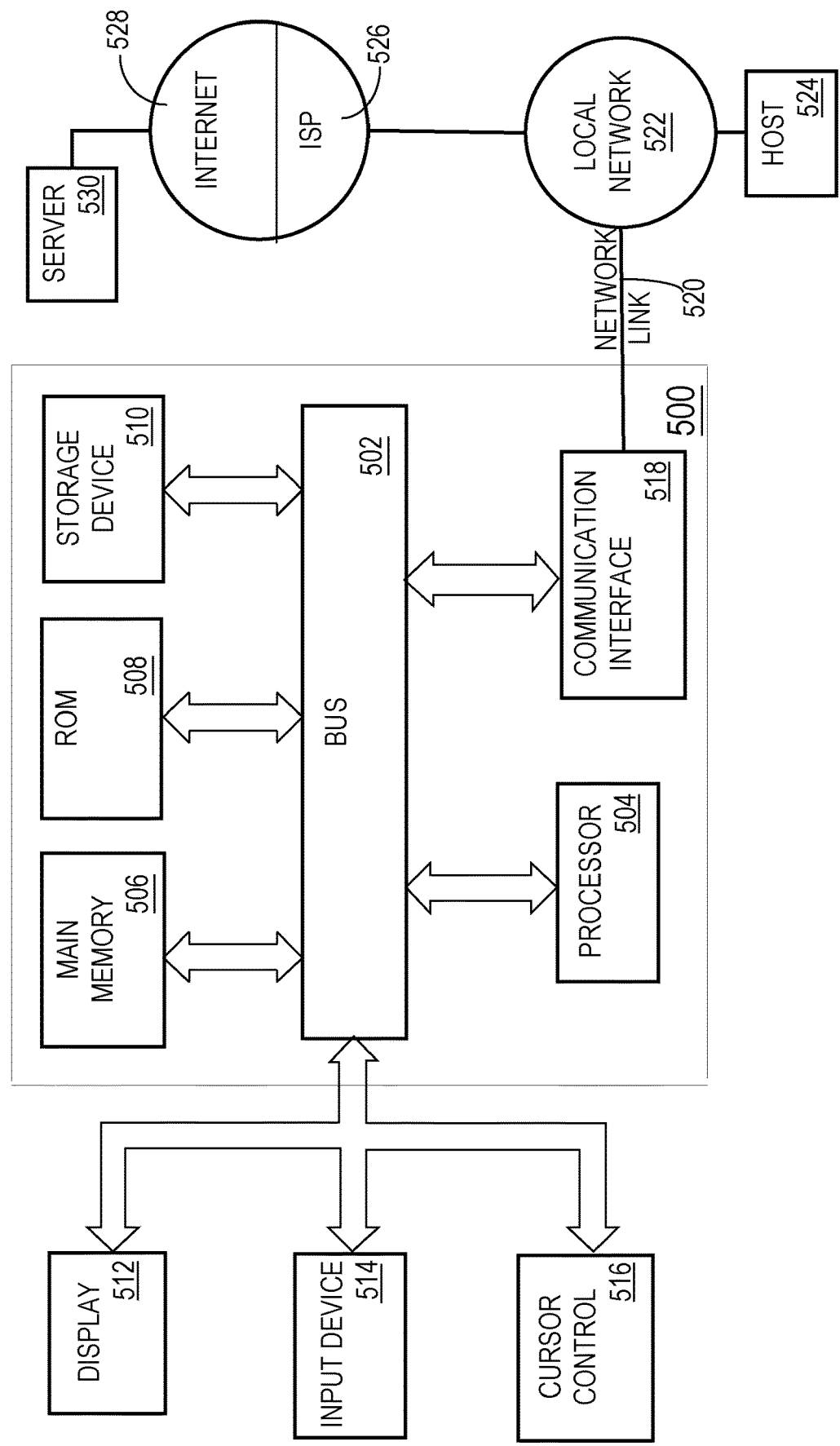
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a first notification event from a first notification service;
   receiving a second notification event from a second notification service, wherein the first notification service is distinct from the second notification service;
   identifying a first plurality of utility scores associated with the first notification event, wherein each utility score in the first plurality of utility scores is associated with a different utility of a plurality of utilities and at least one of the first plurality of utility scores represents a first probability of a target user performing a particular action;
   using a machine-learned model that takes the first plurality of utility scores as input, assigning a first score to the first notification event;
   identifying a second plurality of utility scores associated with the second notification event, wherein each utility score in the second plurality of utility scores is associated with a different utility of the plurality of utilities and at least one of the second plurality of utility scores represents a second probability of a second target user performing the particular action;
   using the machine-learned model that takes the second plurality of utility scores as input, assigning a second score to the second notification event;
   based on the first score, determining to generate a first notification message for the first notification event and sending the first notification message to a computing device of the target user;
   based on the second score, determining not to generate a second notification message for the second notification event;
   wherein the method is performed by one or more computing devices.

2. The method of claim 1, wherein determining to generate the first notification message for the first notification event and sending the first notification message to the computing device of the target user comprises:
   comparing the first score to a first decision threshold, wherein the first decision threshold represents a score threshold value for determining whether to generate and send a new notification message;
   wherein generating and sending the first notification message is performed in response to determining that the first score is greater than the first decision threshold.

3. The method of claim 1, wherein determining not to generate the second notification message for the second notification event comprises:
   comparing the second score to a first decision threshold, wherein the first decision threshold represents a threshold value for determining whether to generate and send a new notification message;
   wherein determining not to generate the second notification message for the second notification event is based on determining that the second score is less than the first decision threshold.

4. The method of claim 3, further comprising:
   comparing the second score to a second decision threshold, wherein the second decision threshold represents a second threshold value for determining whether to send a notification event to an event queue for future evaluation or to drop the notification event;
   in response to determining that the second score is less than the second decision threshold, dropping the second notification event.

5. A method comprising:
   receiving a first notification event from a first notification service;
   receiving a second notification event from a second notification service, wherein the first notification service is distinct from the second notification service;
   using a machine-learned model, assigning a first score to the first notification event and a second score to the second notification event;
   based on the first score, determining to generate a first notification message for the first notification event and sending the first notification message to a computing device of a target user;
   based on the second score, determining not to generate a second notification message for the second notification event;
   wherein determining not to generate the second notification message for the second notification event comprises:
     comparing the second score to a first decision threshold, wherein the first decision threshold represents a first threshold value for determining whether to generate and send a new notification message;
     wherein determining not to generate the second notification message for the second notification event is based on determining that the second score is less than the first decision threshold;
   comparing the second score to a second decision threshold, wherein the second decision threshold represents a second threshold value for determining whether to send a notification event to an event queue for future evaluation or to drop the notification event;
   in response to determining that the second score is greater than the second decision threshold, sending the second notification event to the event queue for future evaluation;
   wherein the method is performed by one or more computing devices.

6. The method of claim 5, further comprising:
   receiving a set of notification events that have been previously queued in the event queue, wherein each notification event in the set of notification events has an associated score;
   based on the associated scores of the set of notification events, determining, for at least a subset of the set of notification events, to generate one or more notification messages for the subset and sending the one or more notification messages to the target user.

7. The method of claim 6, wherein the one or more notification messages contain content from notification events originating from both the first notification service and the second notification service.

8. The method of claim 1, wherein features of the machine-learned model comprise the plurality of utilities for different feature objectives and each of the plurality of utilities has an associated weight value; and
   wherein the plurality of utilities comprise two or more of:
      a user session initiation probability score that describes a third probability that a particular user will initiate a new user session in response to receiving a notification message,
      an expected session score for a second new user session for the particular user that describes a level of interaction for the second new user session,
      a user click probability score that describes a fourth probability that the particular user will click on the notification message in response to receiving the notification message, or
      a user notification disable score that describes a fifth probability that the particular user will disable notification functionality on a client device in response to receiving the notification message.

9. The method of claim 1, wherein the first notification event is associated with one or more utility scores, of the first plurality of utility scores, generated by the first notification service, for feature objectives that are used to assign the first score.

10. The method of claim 9, further comprising:
   receiving updated user interaction metrics; and
   modifying a utility score of the one or more utility scores associated with the first notification event to generate a modified utility score;
   wherein using the machine-learned model comprises inputting the modified utility score into the machine-learned model;
   wherein the first score is based on the modified utility score.

11. The method of claim 1, wherein sending the first notification message to the computing device of the target user, comprises:
   determining a delivery time based upon historical user activity of the target user;
   scheduling to send the first notification message to the computing device of the target user based on the delivery time; and
   at the delivery time, sending the first notification message to the computing device of the target user.

12. The method of claim 1, wherein sending the first notification message to the computing device of the target user comprises:
   comparing the first score to a first routing threshold, wherein the first routing threshold represents a score threshold value for determining whether to send a new notification message as a push notification or as an in-application notification;
   if the first score is above the first routing threshold, then sending the first notification message as a first push notification message; and
   if the first score is below the first routing threshold, then sending the first notification message as a first in-application notification message.

13. The method of claim 1, wherein sending the first notification message to the computing device of the target user comprises:
   wherein the first notification event was previously stored in an event queue for a first period of time;
   comparing the first period of time of the first notification event to a first queue threshold duration value, wherein the first queue threshold duration value represents a threshold value for determining whether to send a new notification message as an in-application notification or as an email notification;
   if the first period of time is below the first queue threshold duration value, then sending the first notification message as a first in-application notification message; and
   if the first period of time is above the first queue threshold duration value, then sending the first notification message as a first email notification message.

14. A computer program product comprising:
   one or more non-transitory computer-readable storage media comprising instructions which, when executed by one or more processors, cause:
      receiving a first notification event from a first notification service;
      receiving a second notification event from a second notification service, wherein the first notification service is distinct from the second notification service;
      using a machine-learned model, assigning a first score to the first notification event and a second score to the second notification event;
      wherein the first notification event is associated with one or more utility scores, generated by the first notification service, for feature objectives that are used to assign the first score;
      based on the first score, determining to generate a first notification message for the first notification event and sending the first notification message to a computing device of a target user; and
      based on the second score, determining not to generate a second notification message for the second notification event.

15. The computer program product of claim 14, wherein determining to generate the first notification message for the first notification event and sending the first notification message to the target user comprises:
   comparing the first score to a first decision threshold, wherein the first decision threshold represents a score threshold value for determining whether to generate and send a new notification message;
   wherein generating and sending the first notification message is performed in response to determining that the first score is greater than the first decision threshold.

16. The computer program product of claim 14, wherein determining not to generate the second notification message for the second notification event comprises:
   comparing the second score to a first decision threshold, wherein the first decision threshold represents a threshold value for determining whether to generate and send a new notification message;
   wherein determining not to generate the second notification message for the second notification event is based on determining that the second score is less than the first decision threshold.

17. The computer program product of claim 16, wherein the one or more non-transitory computer-readable storage media comprises further instructions which, when executed by the one or more processors, cause:
   comparing the second score to a second decision threshold, wherein the second decision threshold represents a second threshold value for determining whether to send a notification event to an event queue for future evaluation or to drop the notification event;

in response to determining that the second score is greater than the second decision threshold, sending the second notification event to the event queue for future evaluation.

18. The computer program product of claim 17, wherein the one or more non-transitory computer-readable storage media comprises further instructions which, when executed by the one or more processors, cause:
- receiving a set of notification events that have been previously queued in the event queue, wherein each notification in the set of notification events has an associated score;
- based on the associated scores of the set of notification events, determining, for at least a subset of the set of notification events, to generate one or more notification messages for the subset and sending the one or more notification messages to the target user.

19. The method of claim 1, wherein the target user is a first target user, wherein the first notification event indicates a plurality of target users that includes the first target user and a third target user, the method further comprising:
- using the machine-learned model, assigning a third score to the first notification event;
- based on the third score, determining whether to send a third notification message for the first notification event to a second computing device of the third target user.

20. The method of claim 1, wherein:
- a feature of the machine-learned model comprises a particular utility score for a feature objective;
- the particular utility score is a user notification disable score that describes a probability that the particular user will disable notification functionality on ae client device in response to receiving a notification message.

* * * * *